(12) United States Patent
Asakura et al.

(10) Patent No.: US 10,533,648 B2
(45) Date of Patent: Jan. 14, 2020

(54) PRODUCTION METHOD OF BALL SCREW DEVICE AND PRODUCTION METHOD OF STEERING SYSTEM USING BALL SCREW DEVICE

(71) Applicant: JTEKT CORPORATION, Osaka-shi, Osaka (JP)

(72) Inventors: Toshihiro Asakura, Chiryu (JP); Takuya Nakayama, Okazaki (JP); Keisuke Ogawa, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 216 days.

(21) Appl. No.: 15/604,862

(22) Filed: May 25, 2017

(65) Prior Publication Data
US 2017/0350483 A1  Dec. 7, 2017

(30) Foreign Application Priority Data
Jun. 1, 2016  (JP) ................. 2016-110460

(51) Int. Cl.
*B62D 5/00* (2006.01)
*F16H 25/22* (2006.01)
(Continued)

(52) U.S. Cl.
CPC .......... *F16H 25/2233* (2013.01); *B62D 3/08* (2013.01); *B62D 5/00* (2013.01); *B62D 5/0424* (2013.01); *B62D 5/0448* (2013.01)

(58) Field of Classification Search
CPC ......... F16H 25/2233; F16H 2025/2481; B62D 3/08; B62D 5/0424; B62D 5/0448
See application file for complete search history.

(56) References Cited

U.S. PATENT DOCUMENTS 6,463,830 B1 * 10/2002 Ito ................. F16H 48/147
74/650
6,736,235 B2 * 5/2004 Yoshida ............... B62D 5/0427
180/444

(Continued)

FOREIGN PATENT DOCUMENTS

EP   2 110 580 A1   10/2009
JP   H02-5145 U   1/1990
(Continued)

OTHER PUBLICATIONS

Mar. 8, 2018 Search Report issued in European Patent Application No. 17173764.6.

*Primary Examiner* — Rick K Chang
(74) *Attorney, Agent, or Firm* — Oliff PLC

(57) ABSTRACT

A production method of a ball screw device is provided. The ball screw device includes a ball screw portion, a ball nut, rolling balls, and a retainer. The production method of the ball screw device includes: a first preparation step of preparing a nut subassembly as a standard product; a second preparation step of preparing the ball screw portion in plurality by types as ranked products; a measuring step of measuring a relative displacement in a thrust direction between the standard product and each ranked product; a determination step of determining whether the displacement meets a displacement specification; a replacing step of, if the displacement does not meet the specification, replacing the ranked product with another ranked product; and an assembling step of, if the displacement meets the specification, assembling the standard product and the ranked product into the ball screw device.

6 Claims, 9 Drawing Sheets

(51) Int. Cl.
*B62D 3/08* (2006.01)
*B62D 5/04* (2006.01)

(56) References Cited

U.S. PATENT DOCUMENTS 9,346,485 B2 * 5/2016 Muto .................. B62D 5/0448
2009/0255752 A1 10/2009 Asakura et al.

FOREIGN PATENT DOCUMENTS

| JP | H06-288458 A | 10/1994 |
| JP | 2006-349148 A | 12/2006 |
| JP | 5120040 B2 | 1/2013 |

* cited by examiner

PRODUCTION METHOD OF BALL SCREW DEVICE AND PRODUCTION METHOD OF STEERING SYSTEM USING BALL SCREW DEVICE

INCORPORATION BY REFERENCE

The disclosure of Japanese Patent Application No. 2016-110460 filed on Jun. 1, 2016 including the specification, drawings and abstract, is incorporated herein by reference in its entirety.

BACKGROUND OF THE INVENTION

1. Field of the Invention

The present invention relates to a production method of a ball screw device and a production method of a steering system using the ball screw device.

2. Description of Related Art

Conventionally, ball screw device as described in Japanese Patent No. 5120040 (JP 5120040), Japanese Utility Model Application Publication No. 2-5145, and Japanese Patent Application Publication No. 6-288458 (JP 6-288458 A) have been used. These ball screw device each include a ball screw shaft having a ball groove formed on its outer periphery, a ball nut disposed on the outer peripheral side of the ball screw shaft and having a ball groove formed on its inner periphery, and a plurality of rolling balls that are retained in a rollable manner between the respective ball grooves of the ball screw shaft and the ball nut. Each ball screw device transmits rotational force of the ball screw shaft or the ball nut via the respective ball grooves and the rolling balls. The ball screw device thus configured has a small clearance between the respective ball grooves and the rolling balls, and this clearance allows the ball screw shaft and the ball nut to relatively move in the thrust direction. With this configuration, smooth operation of the ball screw device can be achieved.

However, when this clearance exceeds a certain value, a vibration, for example, during operation of the ball screw device may cause (inner surfaces of) the respective ball grooves to hit the rolling balls after moving by an amount corresponding to the clearance and generate a loud hitting noise (rattle noise). If the energy of this hitting is large, friction may be generated between the respective ball grooves and the rolling balls. In view of this, in the ball screw device, dimensions of various parts of the respective ball grooves and the rolling balls are usually accurately controlled in production processes of the respective components such that the size of the clearance in the thrust direction does not exceeds the certain value.

However, producing the respective components with high accuracy has limitations and causes cost increase. In this regard, in reality, the respective ball grooves and the rolling balls are formed within an accuracy range that can be achieved in production. Furthermore, the ball screw device is temporarily assembled, and the clearance in the thrust direction generated between the ball screw shaft and the ball nut is measured for confirmation. If the size of the clearance thus measured falls within a predetermined specification, the ball screw device is determined as accepted. However, if the clearance is out of the specification, the ball screw device is determined as rejected, and any one or all of the ball nut, the ball screw shaft, and the rolling balls are replaced with products of other lots that are formed in dimensions different from those of the assembled components, and are reassembled. The clearance is then measured again to perform acceptance/rejection determination. These processes are repeated until the measured clearance is determined as accepted.

Specifically, if the measured clearance is out of the specification, for example, the assembled rolling balls are replaced with new rolling balls that are each formed in a diameter different from the diameter of the originally assembled ones. In this case, it is often that the ball screw shaft and the ball nut are not replaced. In general, the ball screw shaft and the ball nut that are not replaced are disassembled and washed, and are then assembled again. In general, the originally assembled rolling balls are all discarded because it is difficult to perform quality assurance thereon. These processes require much time and many components, which may cause significant cost increase.

SUMMARY OF THE INVENTION

An object of the present invention is to provide a production method of a ball screw device at low production cost and a production method of a steering system using the ball screw device.

In a production method of a ball screw device according to one aspect of the present invention, the ball screw device includes: a ball screw shaft having an outer peripheral surface on which an outer-peripheral ball rolling groove is spirally formed; a ball nut having an inner peripheral surface on which an inner-peripheral ball rolling groove is spirally formed; a rolling ball that is arranged between the outer-peripheral ball rolling groove and the inner-peripheral ball rolling groove in a circulatable manner; and a retainer disposed between an outer periphery of the ball screw shaft and an inner periphery of the ball nut, and having a cylindrical portion with a retainer groove that retains the rolling ball such that radially outward movement of the rolling ball is allowed and radially inward movement thereof is restricted.

The production method of the ball screw device includes: a first preparation step of preparing, as a standard product, a nut subassembly into which the ball nut and the retainer are integrated with the rolling ball interposed therebetween; a second preparation step of setting a plurality of dimensional groups for an outer pitch circle diameter of the outer-peripheral ball rolling groove, and preparing the ball screw shaft in plurality by types as a plurality of types of ranked products, the ball screw shaft being formed such that the outer pitch circle diameter belongs to any one of the dimensional groups and being allowed to be assembled with the standard product; a measuring step of measuring a relative displacement in a thrust direction between one ranked product among the plurality of types of the ranked products and the standard product that are assembled; a determination step of determining whether the relative displacement falls within a displacement specification; a replacing step of, if it has been determined at the determination step that the relative displacement does not fall within the displacement specification, replacing the ranked product, the relative displacement of which has been measured, with another ranked product prepared; and an assembling step of, if it has been determined at the determination step that the relative displacement falls within the displacement specification, assembling the standard product and the ranked product, the relative displacement of which has been measured, so as to form the ball screw device.

As described above, the ball screw shafts prepared in plurality by types as the ranked products at the second preparation step are sequentially assembled with the nut subassembly integrated as the standard product, the relative displacement (clearance) in the thrust direction is checked, and a ball screw shaft the relative displacement of which falls within the specification is searched for as an accepted product. Subsequently, the nut subassembly as the standard product and the ball screw shaft as the accepted product are assembled into the ball screw device. In this manner, by replacing the ball screw shaft alone, the ball screw device can be produced with high accuracy. This eliminates the need for conventional processes of, when the relative displacement does not fall within the specification, disassembling the rolling balls and the ball nut that are assembled, replacing all of the rolling balls, washing the ball nut, and assembling these components again. This also eliminates waste because the ball screw shaft as the ranked product that has been replaced can be used for another nut subassembly (standard product). Thus, the ball screw device can be produced at low cost.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
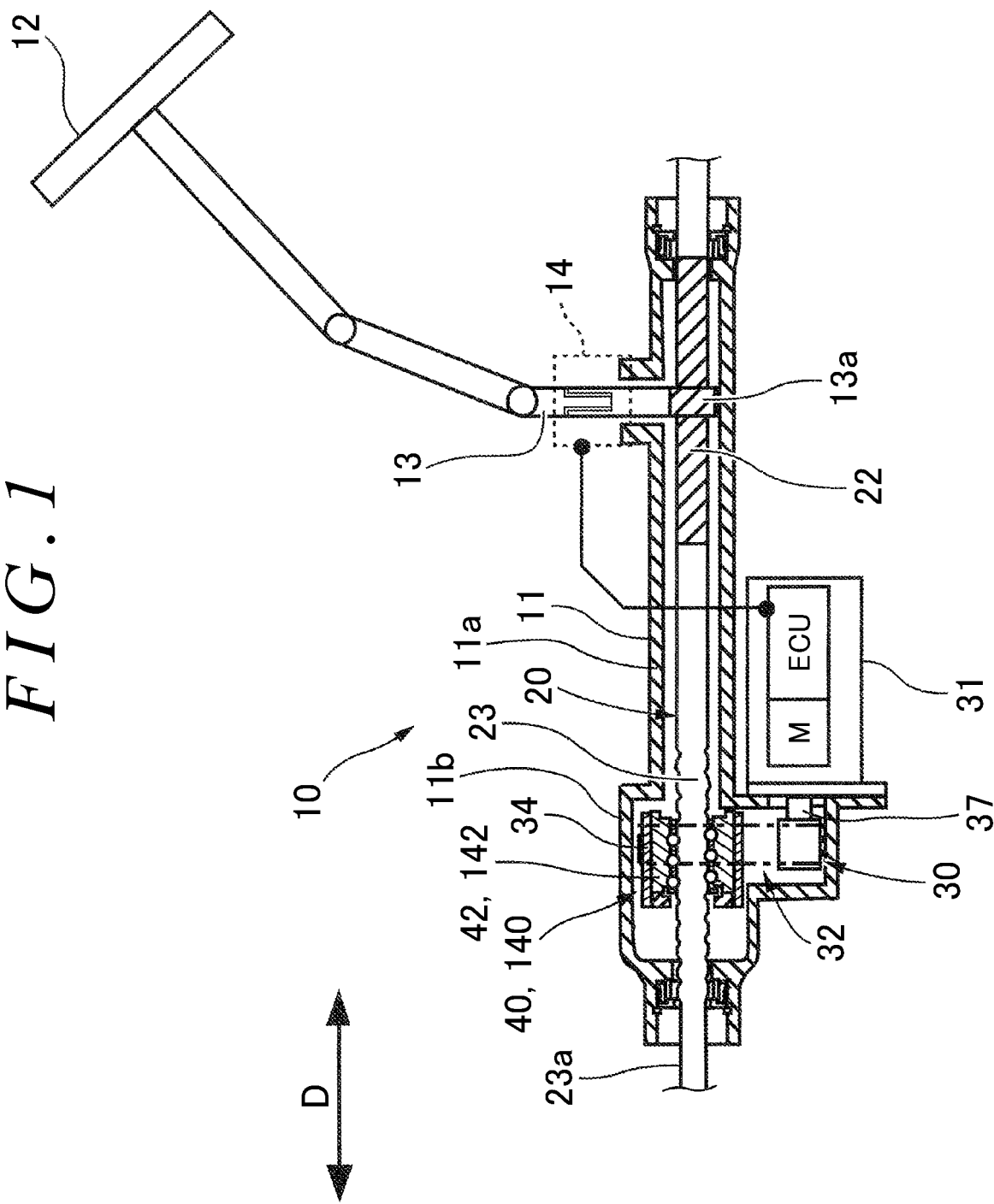
FIG. 1 is a schematic diagram illustrating an entire configuration of a steering system including a ball screw device according to an embodiment.

A first embodiment of the present invention will now be described with reference to the drawings. FIG. 1 is a diagram of an entire configuration of an electric power steering system (corresponding to a steering system) of a vehicle, in which a mode is exemplified in which a ball screw device produced by a production method according to the present invention is used in the electric power steering system.

The electric power steering system is a steering system that assists steering force with steering assist force. The ball screw device of the present invention may be used in various systems in which the ball screw device can be used, such as a four-wheel steering system, a rear-wheel steering system, a steer-by-wire steering system in addition to the electric power steering system.

This electric power steering system 10 (hereinafter, simply called "steering system 10") is a system that changes the orientation of steered wheels (not depicted) of a vehicle by moving a steering operation shaft 20 coupled to the steered wheels in a reciprocating manner in an axial direction D (lateral direction in FIG. 1).

As depicted in FIG. 1, the steering system 10 includes a housing 11, a steering wheel 12, a steering shaft 13, a torque detection device 14, an electric motor M (hereinafter, called "motor M"), the steering operation shaft 20, a steering assist mechanism 30, and a ball screw device 40.

The housing 11 is a fixing member that is fixed to the vehicle. The housing 11 is formed in a tubular shape through which the steering operation shaft 20 (corresponding to a ball screw shaft) is disposed so as to be relatively movable in the axial direction D. The housing 11 includes a first housing 11a and a second housing 11b that is fixed to one end (left side in FIG. 1) of the first housing 11a in the axial direction D.

The steering wheel 12 is fixed to an end portion of the steering shaft 13, and is rotatably supported in a passenger compartment. The steering shaft 13 transmits torque applied to the steering wheel 12 by operation of a driver to the steering operation shaft 20.

On an end portion of the steering shaft 13 on the steering operation shaft 20 side, a pinion 13a that is a component of a rack-and-pinion mechanism is formed. The torque detection device 14 detects torque applied to the steering shaft 13 on the basis of the amount of torsion in the steering shaft 13.

The steering operation shaft 20 extends in the axial direction D. The steering operation shaft 20 is supported by the housing 11 so as to be linearly movable in a reciprocating manner along the axial direction D. On the steering operation shaft 20, a rack 22 is formed. The rack 22 meshes with the pinion 13a of the steering shaft 13, and constitutes the rack-and-pinion mechanism together with the pinion 13a.

On the steering operation shaft 20, a ball screw portion 23 is formed in a position different from that of the rack 22. The ball screw portion 23 corresponds to the ball screw shaft in the ball screw device, which constitutes the ball screw device 40 together with a ball nut 42 described later, and to which steering assist force is transmitted by the steering assist mechanism 30. Both ends of the steering operation shaft 20 are coupled to right and left steered wheels (not depicted) via tie rods and knuckle arms (not depicted), for example. The steered wheels are steered right and left by axial movement of the steering operation shaft 20.

The steering assist mechanism 30 is a mechanism that uses the motor M as a driving source to apply steering assist force to the steering operation shaft 20 (ball screw portion 23). The steering assist mechanism 30 includes the motor M, a control unit ECU for driving the motor M, and a driving-force transmission mechanism 32. The motor M and the control unit ECU for driving the motor M are housed in a case 31 that is fixed to the first housing 11a of the housing 11. The control unit ECU determines a steering assist torque based on an output signal of the torque detection device 14 to control the output of the motor M.

Figure 2:
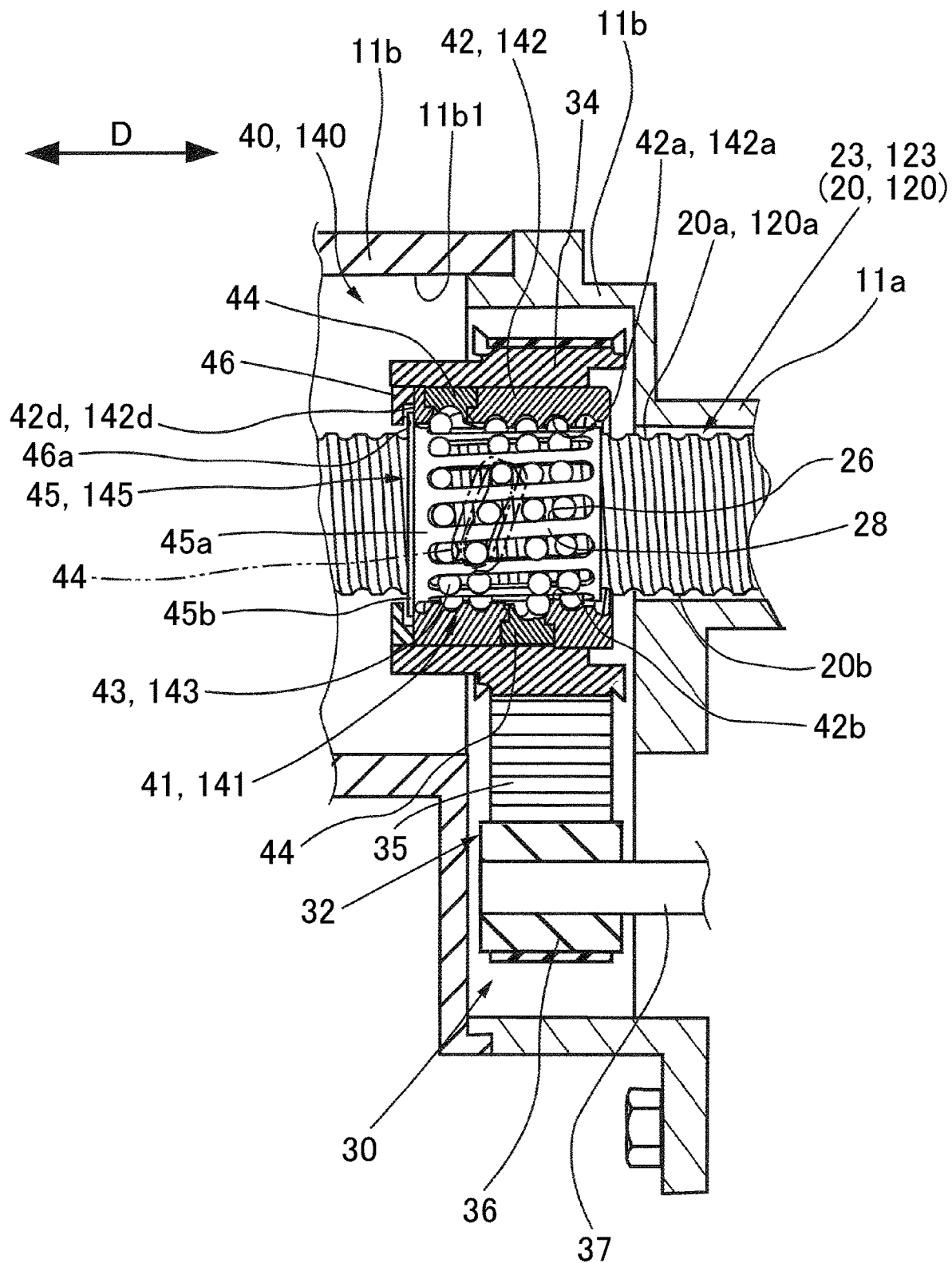
FIG. 2 is a sectional view illustrating a configuration of the ball screw device in FIG. 1.

As depicted in FIG. 2, the driving-force transmission mechanism 32 includes a drive pulley 36, a driven pulley 34, and a toothed belt 35. The drive pulley 36 is attached to an output shaft 37 of the motor M. The output shaft 37 is disposed parallel to the axis of the steering operation shaft 20. The driven pulley 34 is disposed on an outer periphery of the ball nut 42 so as to be rotatable integrally with the ball nut 42. The driven pulley 34 on one end side (left side in FIG. 2) in the axial direction is rotatably supported by an inner peripheral surface 11b1 of the second housing 11b with a ball bearing (not depicted) interposed therebetween. The toothed belt 35 is wound around the drive pulley 36 and the driven pulley 34. The driving-force transmission mechanism 32 transmits rotational driving force generated by the motor M with the toothed belt 35 between the drive pulley 36 and the driven pulley 34.

The following describes a configuration of the ball screw device 40. As depicted in FIG. 2, the ball screw device 40 includes the ball screw portion 23 of the steering operation shaft 20 (ball screw shaft) and a nut subassembly 41 (hereinafter, referred to as "nut S/A 41"). The ball screw device 40 is housed mainly in the second housing 11b.

Figure 3:
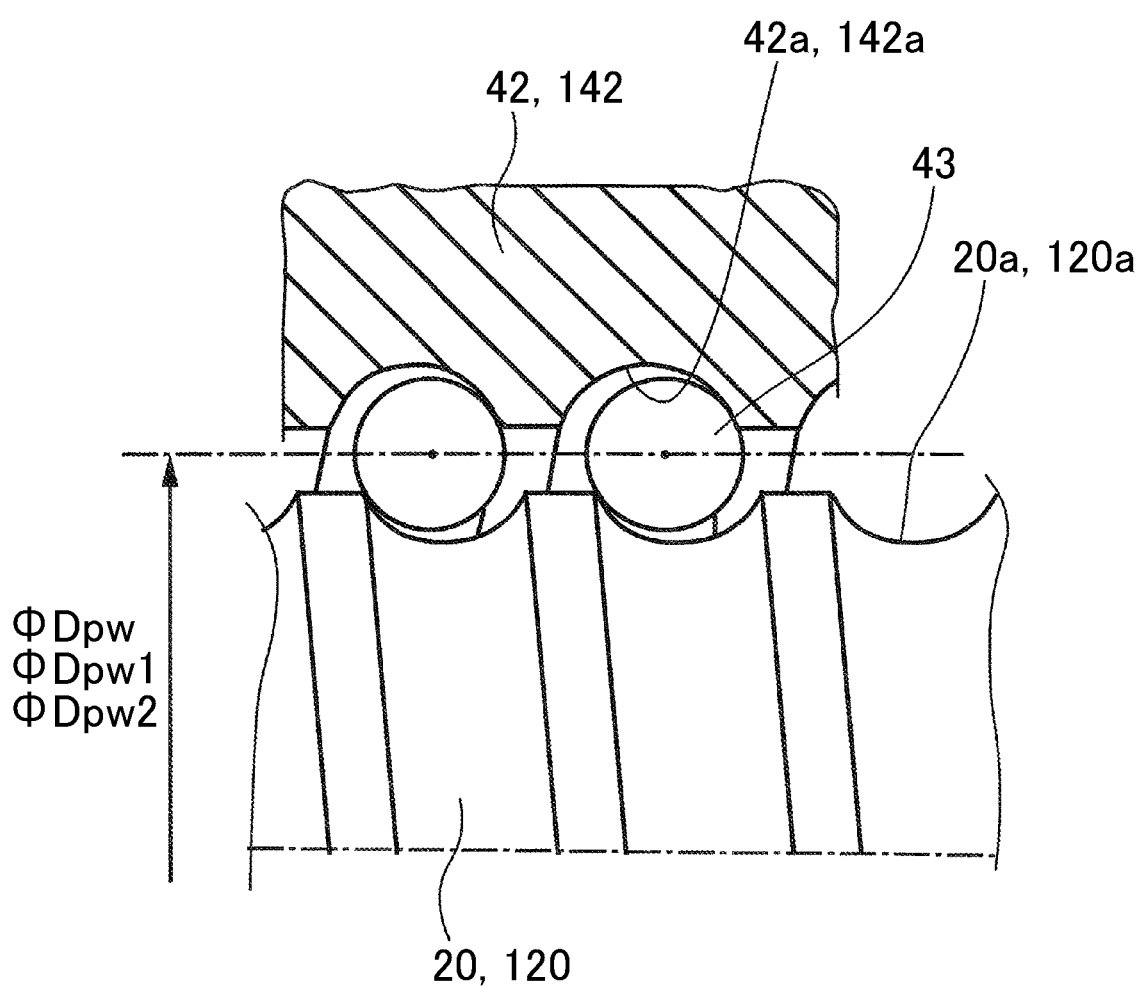
FIG. 3 is a diagram illustrating a state of contact among a ball nut, rolling balls, and a steering operation shaft.

The ball screw portion 23 of the steering operation shaft 20 has an outer-peripheral ball rolling groove 20a spirally formed on its outer peripheral surface. As depicted in FIG. 3, the outer pitch circle diameter ϕDpw1 (corresponding to the pitch circle diameter ϕDpw described in JIS B1192 (ball screw)) of the outer-peripheral ball rolling groove 20a is formed so as to fall within a range of a predetermined specification (dimensional specification).

Figure 4:
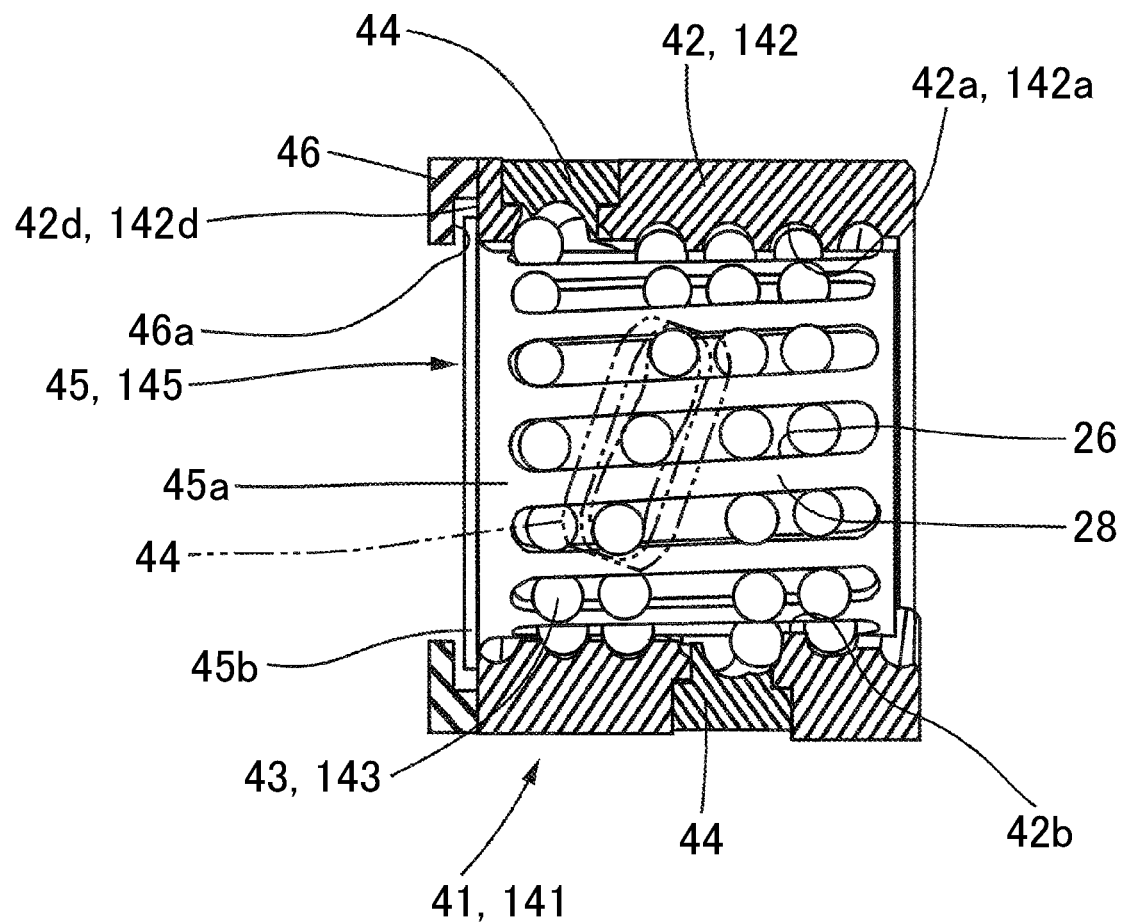
FIG. 4 is a diagram of a nut subassembly, including a partial sectional view.

As depicted in FIG. 4, the nut S/A 41 includes the ball nut 42, a plurality of rolling balls 43, deflectors 44, a retainer 45, and a wall member 46. The ball nut 42 is disposed on the outer peripheral side of the ball screw portion 23. The inner peripheral surface of the ball nut 42 has an inner-peripheral ball rolling groove 42a that is spirally formed. As depicted in FIG. 3, the inner pitch circle diameter ϕDpw2 (corresponding to the pitch circle diameter ϕDpw described in JIS B1192) of the inner-peripheral ball rolling groove 42a is formed so as to fall within a range of a predetermined specification (dimensional specification).

The outer pitch circle diameter ϕDpw1 of the outer-peripheral ball rolling groove 20a of the ball screw portion 23 and the inner pitch circle diameter ϕDpw2 of the inner-peripheral ball rolling groove 42a of the ball nut 42 are theoretically the same dimension (ϕDpw). The pitch circle diameter ϕDpw in JIS B1192 is a dimension that is usually denoted by Pitch Circle Diameter (PCD). Specifically, the pitch circle diameter ϕDpw (PCD) of the outer-peripheral ball rolling groove 20a of the ball screw portion 23 and the inner-peripheral ball rolling groove 42a of the ball nut 42 is a diameter of a cylinder that includes the centers of the rolling balls 43 when the outer-peripheral ball rolling groove 20a and the inner-peripheral ball rolling groove 42a are in contact with the rolling balls 43 at theoretical contact points (based on JIS B1192).

The rolling balls 43 are arranged so as to roll in a ball track formed between the outer-peripheral ball rolling groove 20a of the ball screw portion 23 and the inner-peripheral ball rolling groove 42a of the ball nut 42 and be circulatable. In the present embodiment, all of the rolling balls 43 have the same diameter ϕB, and the diameter ϕB is formed so as to fall within the range of the predetermined specification (dimensional specification). However, the present invention is not limited to this mode, and a spacer ball that is formed in a diameter different from that of the rolling balls 43 may be disposed between the rolling balls 43. The spacer ball is configured to rotate freely between the rolling balls 43 to reduce friction generated between the rolling balls 43 when the rolling balls 43 rotate in the same direction while being contact with each other. The technique of the spacer ball is known (see Japanese Patent Application Publication No. 2006-349148 (JP 2006-349148 A), for example), and thus detailed description thereof is omitted.

The deflectors 44 are members configured to circulate the rolling balls 43 between an adjacent pair of the ball rolling grooves 20a and 42a, and are provided in plurality on the circumference of the ball nut 42. The wall member 46 is attached to an end surface 42d of the ball nut 42, and has an end surface 46a that faces the end surface 42d of the ball nut 42 with a clearance therebetween. The size of the clearance between the end surface 42d and the end surface 46a is a size that allows a flange portion 45b of the retainer 45 described later to be inserted therein.

The retainer 45 includes a cylindrical portion 45a having a thin cylindrical shape and the flange portion 45b that is provided on an end surface of one end (left side in FIG. 2) of the cylindrical portion 45a and that can be in contact with the end surface 42d of the ball nut 42. The cylindrical portion 45a is disposed between the outer peripheral surface 20b of the ball screw portion 23 and the inner peripheral surface 42b of the ball nut 42. The retainer 45 has, on the circumference of the cylindrical portion 45a, a plurality of retainer grooves 26 configured to retain the rolling balls 43.

As depicted in FIG. 2, the retainer grooves 26 each have an elongated-hole shape that extends in the axial direction D of the steering operation shaft 20 (ball screw shaft), and are formed so as to be arranged at regular angular intervals (at a constant pitch) on the circumference of the cylindrical portion 45a.

Each retainer groove 26 is inclined at a predetermined angle with respect to the axis of the ball screw portion 23 so as to be orthogonal to the respective ball rolling grooves 20a and 42a of the ball screw portion 23 and the ball nut 42. In other words, each retainer groove 26 is formed so as to be inclined by the lead angle of the ball rolling grooves 20a and 42a and be orthogonal to the respective ball rolling grooves 20a and 42a. However, the present invention is not limited to this, and the retainer groove 26 may be formed so as to be parallel to the axis of the ball screw portion 23.

Figure 5:
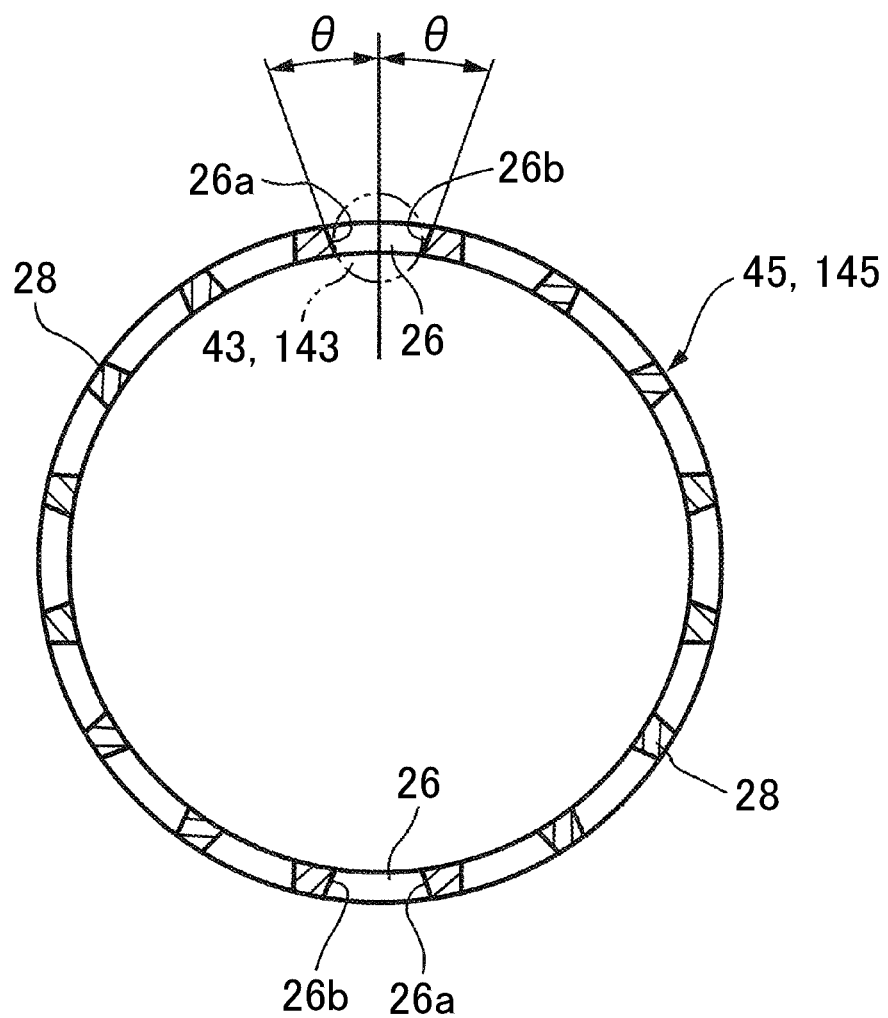
FIG. 5 is a radially sectional view of a cylindrical portion of a retainer.

As depicted in FIG. 5, both side surfaces of each retainer groove 26 are formed by inclined surfaces. Specifically, both side surfaces are formed by inclined surfaces 26a and 26b each of which is inclined by a predetermined angle θ such that the groove width therebetween increases toward the radial outside of the cylindrical portion 45a. In other words, the cross-sectional shape of the retainer groove 26 is a downward-widening shape formed by the inclined surfaces 26a and 26b.

Figure 6:
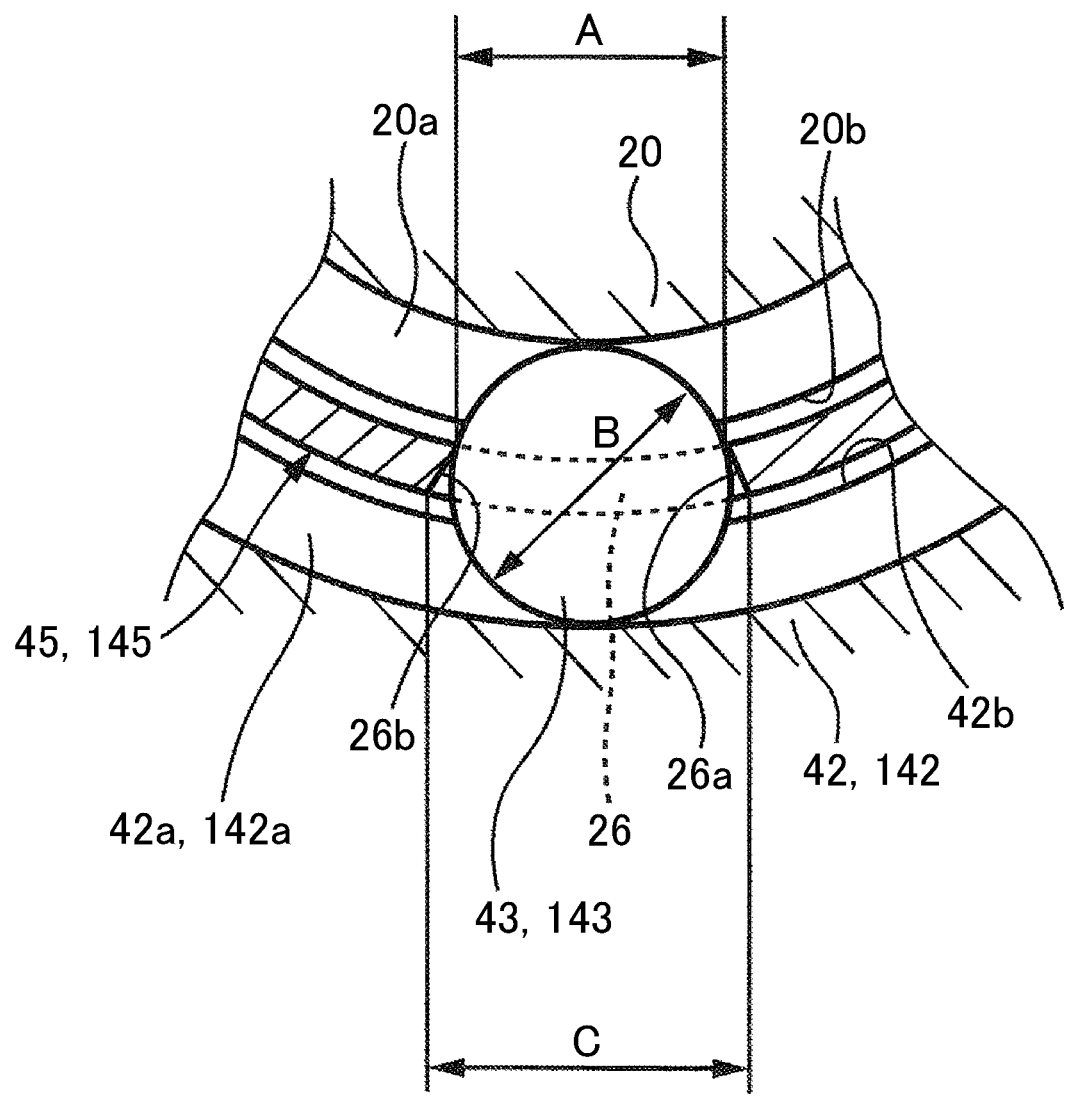
FIG. 6 is a diagram illustrating a state of contact between the retainer and a rolling ball.

As depicted in FIG. 6, with the inclined surfaces 26a and 26b, the groove width of the retainer groove 26 is formed so as to be smaller than the diameter dimension B (ϕB) of the rolling balls 43 in the inner periphery of the retainer 45 and be greater than the diameter dimension B of the rolling balls 43 in the outer periphery of the retainer 45. In other words, when the groove width in the inner periphery of the retainer 45 is a groove width A and the groove width in the outer periphery of the retainer 45 is a groove width C, there is a relationship of A<B<C. Thus, with the inclined surfaces 26a and 26b (both side surfaces) of the retainer grooves 26, the retainer 45 allows radially outward movement of the rolling balls 43 and restricts radially inward movement thereof.

The flange portion 45b is formed in an annular shape in the circumferential direction. The flange portion 45b is disposed between the end surface 46a of the wall member 46 and the end surface 42d of the ball nut 42 as depicted in FIG. 2, whereby axial movement of the retainer 45 is restricted. With these configurations, the ball nut 42, the rolling balls 43, the deflectors 44, the retainer 45, and the wall member 46 are assembled together into an assembly to constitute the nut S/A 41.

Figure 7:
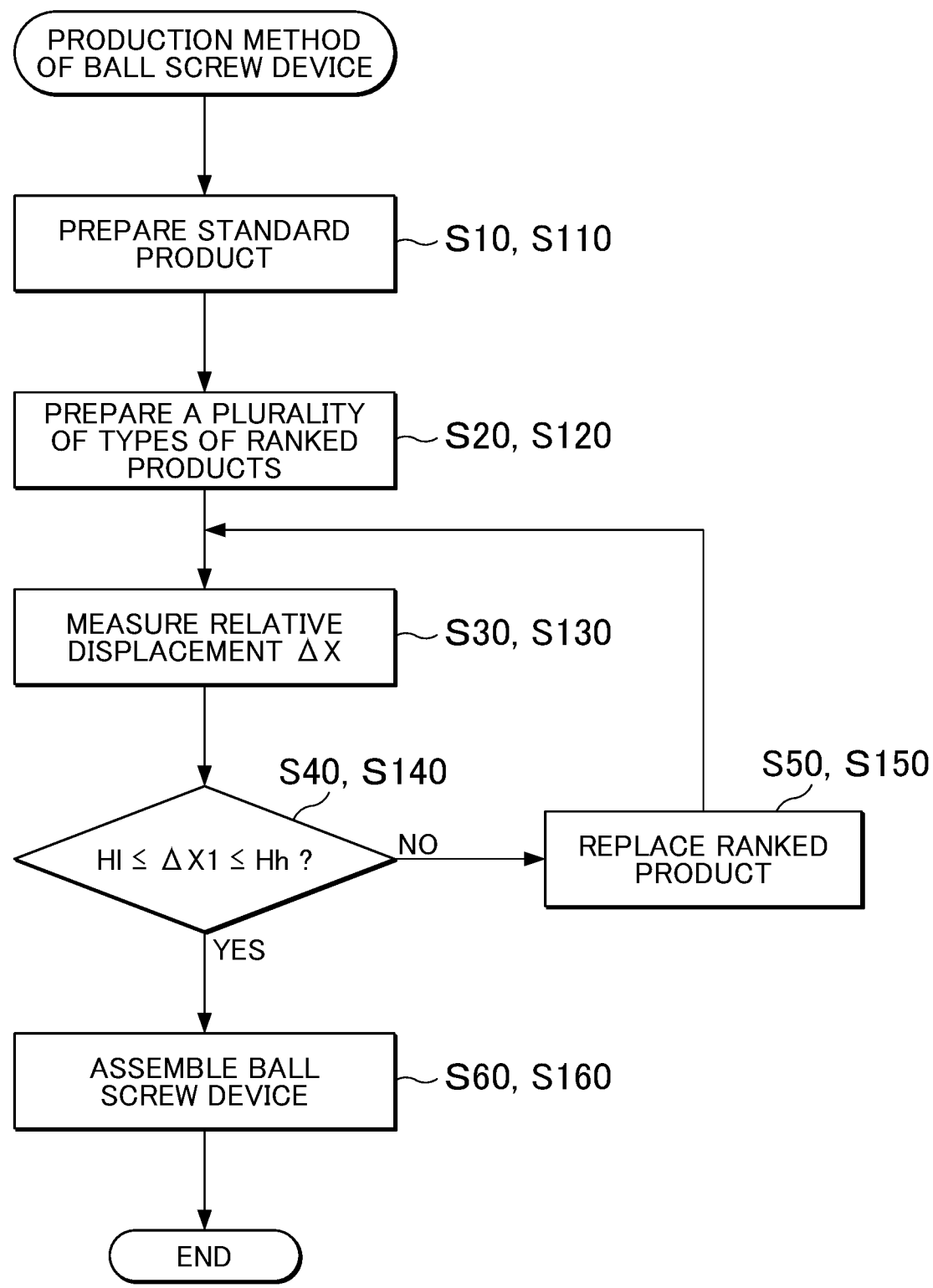
FIG. 7 is a flowchart of a production method of the ball screw device.
Figure 8:
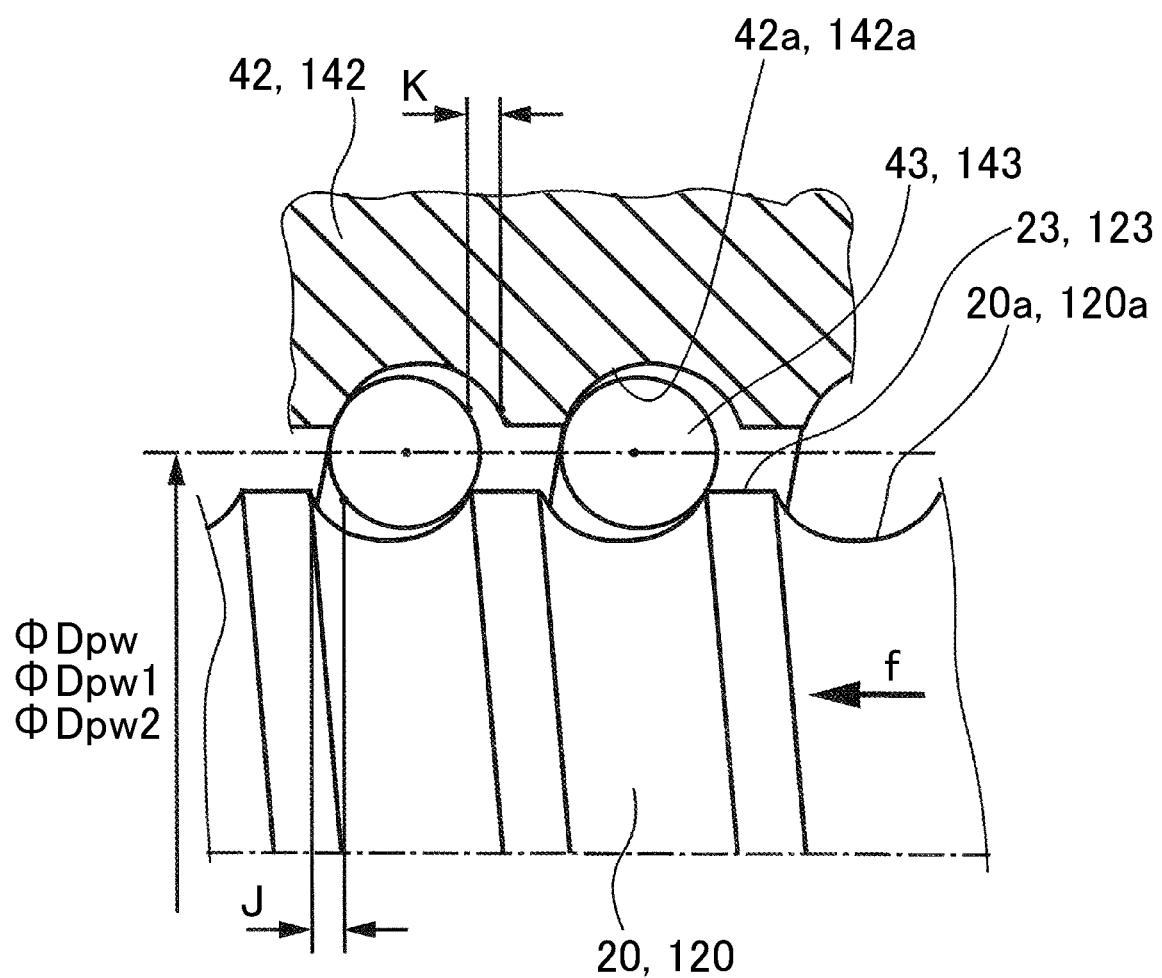
FIG. 8 is a diagram illustrating a measurement start position for the ball nut, the rolling balls, and a steering operation shaft.
Figure 9:
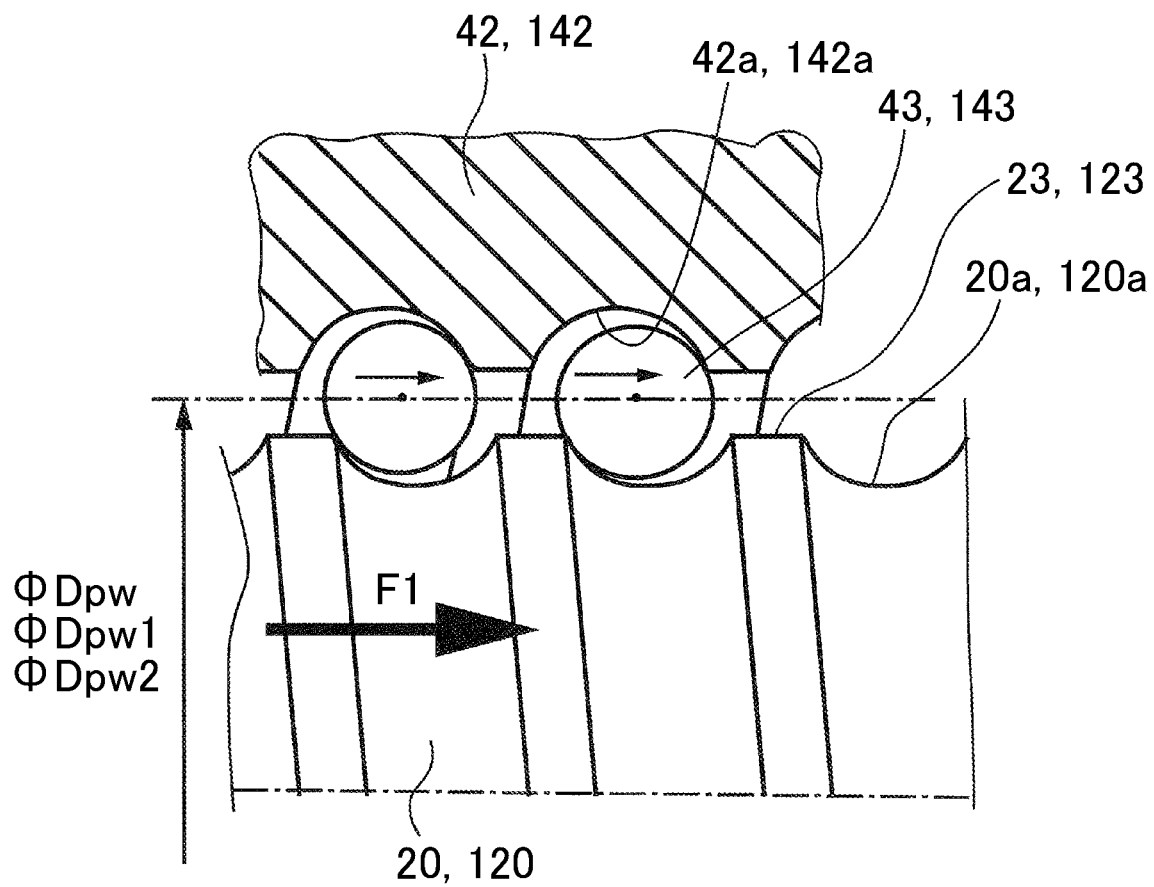
FIG. 9 is a diagram illustrating a state of measuring the relative displacement.

The following describes the production method of the ball screw device 40 with reference to the flowchart in FIG. 7, FIG. 8, and FIG. 9. The production method of the ball screw device 40 according to the embodiment includes a first preparation step S10, a second preparation step S20, a measuring step S30, a determination step S40, a replacing step S50, and an assembling step S60.

At the first preparation step S10, the nut S/A 41 (see FIG. 4) into which the ball nut 42 and the retainer 45 are integrated with the rolling balls 43 interposed therebetween is formed to be prepared. Herein, the nut S/A 41 is a "standard product". The term "standard product" herein means a nut S/A 41 that is assembled by using a ball nut 42, a plurality of rolling balls 43, deflectors 44, a retainer 45, and a wall member 46 that are ordinary ones formed so as to each satisfy the respective dimensional specifications that are set in advance for dimensions of the respective components.

Hereinafter, when each of components constituting the nut S/A 41 as the "standard product" is described, the term "ordinary" is occasionally attached before the name of the components for the description. Medians and widths of the respective dimensional specifications of the dimensions of the respective "ordinary" components that constitute the "standard product" may be equivalent to the medians and the widths of the respective dimensional specifications of the respective dimensions of a ball nut, a rolling ball, and a retainer, for example, used in a ball screw device described in a related art (e.g., JP 5120040).

Herein, one example of a procedure of forming the nut S/A 41 will be briefly described. In order to form the nut S/A 41, to begin with, on the radially inner side of the ordinary ball nut 42 from which all the deflectors 44 have been removed, the cylindrical portion 45a of the retainer 45 is disposed. At this time, the cylindrical portion 45a is disposed such that the flange portion 45b of the retainer 45 is disposed on the end surface 42d side of the ball nut 42 (see FIG. 4).

Subsequently, the rolling balls 43 are sequentially inserted from the respective hole portions on the outer peripheral surface of the ball nut 42 from which all the deflectors 44 have been removed, and are disposed between the inner-peripheral ball rolling groove 42a of the ball nut 42 and the retainer grooves 26. During insertion of the rolling balls 43, the rolling balls 43 are loaded into the inner-peripheral ball rolling groove 42a of the ball nut 42 while pushing separating portions 28 of the cylindrical portion 45a in a direction orthogonal to the extending direction of the separating portions 28, thereby rotating the retainer 45 about the rotation axis.

After a required number of the rolling balls 43 are inserted between the inner-peripheral ball rolling groove 42a and the retainer grooves 26, the deflectors 44 are attached to the hole portions on the outer peripheral surface of the ball nut 42 to fill the hole portions. Subsequently, as depicted in FIG. 4, the wall member 46 is fixed to the end surface 42d of the ball nut 42. The wall member 46 may be fixed before inserting the rolling balls 43. Thus, as depicted in FIG. 4, the rolling balls 43 are retained between the retainer grooves 26 of the retainer 45 and the inner-peripheral ball rolling groove 42a of the ball nut 42, and the nut S/A 41 is completed.

At this time, the inner pitch circle diameter $\phi Dpw2$ ($\phi Dpw$) of the inner-peripheral ball rolling groove 42a formed on the ball nut 42 falls within the range of the predetermined dimensional specification as described above. The diameter of the rolling balls 43 falls within the range of the predetermined dimensional specification.

Subsequently, at the second preparation step S20, the ball screw portion 23 that can be assembled with the standard product (nut S/A 41) prepared at the first preparation step S10 is prepared in plurality by types as "ranked products". Herein, the "ranked products" are ball screw portions 23 each of which is processed and formed one by one such that the outer pitch circle diameter $\phi Dpw1$ of the outer-peripheral ball rolling groove 20a formed on the ball screw portion 23 of the steering operation shaft 20 matches an outer pitch circle diameter $\phi D1$ that belongs to any one dimensional group among a plurality of dimensional groups set in advance. The width of each of the dimensional groups, that is, each interval for the outer pitch circle diameter $\phi Dpw1$, is set such that adjacent intervals do not overlap each other. The expression of being prepared in plurality by types as ranked products means that ball screw portions 23 each having an outer-peripheral ball rolling groove 20a that is formed in an outer pitch circle diameter $\phi D1$ belonging to any one of different dimensional groups (ranks) are prepared in plurality for each of the dimensional groups (ranks). In other words, the ball screw portions 23 as the ranked products are prepared at least one or more for each of the dimensional groups (ranks).

Herein, the widths of the respective dimensional groups for the outer pitch circle diameters $\phi D1$ ($\phi Dpw1$) of the ball screw portions 23 prepared in plurality by types may be set to a constant value (e.g., 10 micrometers). Alternatively, the width of each dimensional group for the outer pitch circle diameters $\phi D1$ may be set to an optional width individually.

On an end surface of each of the steering operation shafts 20 having the ball screw portions 23 prepared as the types of the "ranked products", it is preferable to provide markings that make the size of the corresponding outer pitch circle diameter $\phi D1$ recognizable. For example, the markings may be engraved inscriptions. Herein, the markings may be of any type that makes the outer pitch circle diameter $\phi D1$ recognizable. After the types of the "ranked products (ball screw portions 23)" are prepared, the process proceeds to the measuring step S30.

At the measuring step S30, the relative displacement $\Delta X$ in the thrust direction between the assembled nut S/A 41 (standard product) and one ball screw portion 23 (ranked product) selected from the types of the ball screw portions 23 as the ranked products.

If the process at the measuring step S30 is performed for the first time, the nut S/A 41 (standard product) and the ball screw portion 23 (ranked product) are assembled together prior to the measurement. In the present embodiment, the shaft diameter of a shaft portion 23a (see FIG. 1) on the ball screw portion 23 side in the steering operation shaft 20 (ranked product) is formed in a diameter equal to or smaller than the root diameter of the outer-peripheral ball rolling groove 20a formed on the ball screw portion 23 so that the nut S/A 41 can be assembled to and removed from the ball screw portion 23. Alternatively, the outer-peripheral ball rolling groove 20a may be formed continuously up to an end portion of the steering operation shaft 20 on the ball screw portion 23 side.

Subsequently, the shaft portion 23a of the steering operation shaft 20 (ranked product) is inserted into the bore portion of the nut S/A 41 (standard product). When the end portion of the ball screw portion 23 comes into contact with the rolling balls 43 of the nut S/A 41 (standard product), the ball screw portion 23 (ranked product) is rotated in a tightening direction with respect to the nut S/A 41. Accordingly, the rolling balls 43 are fitted to the outer-peripheral ball rolling groove 20a of the ball screw portion 23, and thus the nut S/A 41 (standard product) and the ball screw portion 23 (ranked product) can be assembled together as depicted in FIG. 2.

After the nut S/A 41 (standard product) and the ball screw portion 23 (ranked product) have been assembled together, the relative displacement ΔX in the thrust direction between the nut S/A 41 (standard product) and the ball screw portion 23 (ranked product) is measured. This measurement of the relative displacement ΔX may be performed with any type of measuring device. A noncontact laser displacement gauge may be used, or a contact displacement gauge may be used.

When the relative displacement ΔX is measured, the assembled nut S/A 41 (standard product) is fixed first. As depicted in FIG. 8, a small load f that allows the ball screw portion 23 (ranked product) to move relative to the nut S/A 41 (standard product) in the thrust direction (e.g., leftward in FIG. 8) is applied to the ball screw portion 23. This small force f may be manually applied by an operator. By this process, the inner-peripheral ball rolling groove 42a of the ball nut 42 on one end side (left side in FIG. 8) and the rolling balls 43 are brought into contact with each other (zero clearance), and the outer-peripheral ball rolling groove 20a of the ball screw portion 23 on the other end side (right side in FIG. 8) and the rolling balls 43 are brought into contact with each other (zero clearance). The position in this state is called a measurement start position.

Subsequently, as depicted in FIG. 9, from the measurement start position, a thrust load F1 is applied to the ball screw portion 23 (ranked product) rightward in FIG. 9, and the relative displacement ΔX1 of the ball screw portion 23 (ranked product) in the thrust direction with respect to the nut S/A 41 (standard product) from the measurement start position is measured. The relative displacement ΔX1 is a displacement of the ball screw portion from the measurement start position to the position where the ball screw portion 23 stops moving. Herein, the relative displacement ΔX1 theoretically equals to the sum (J+K) of the dimension J and the dimension K indicated in FIG. 8. Thus, the thrust load F1 is preferably a load that reliably enables the relative displacement ΔX1 to become the sum (J+K) of the dimension J and the dimension K. The thrust load F1 may be applied by any type of device. After the measurement is completed, the process proceeds to the determination step S40.

At the determination step S40, it is determined whether the relative displacement ΔX1 measured at the measuring step S30 falls within a displacement specification H, that is, within a range of Hl to Hh indicating a range for acceptance determination. At the determination step S40, if it is determined that the relative displacement ΔX1 "does not fall within the displacement specification H", the process proceeds to the replacing step S50. If it is determined that the relative displacement ΔX1 "falls within the displacement specification H", the ball screw portion 23 (ranked product) the relative displacement of which has been measured is an accepted product, and thus the process proceeds to the assembling step S60.

In the above description, the displacement specification H (Hl to Hh) is a range within which, when the ball screw device 40 operates, the rolling balls 43 can smoothly roll in a track groove between the outer-peripheral ball rolling groove 20a of the ball screw portion 23 and the inner-peripheral ball rolling groove 42a of the ball nut 42. The displacement specification H (Hl to Hh) is also a range in which, during a vibration, the situation that the outer-peripheral ball rolling groove 20a or the inner-peripheral ball rolling groove 42a moves by an amount corresponding to the clearance to the rolling balls 43 and hits the rolling balls 43 to generate hitting noise (rattle noise) does not occur (is less likely to occur). The displacement specification H is set in advance based on preliminary tests, for example.

At the replacing step S50, the ball screw portion 23 (ranked product) that is screwed into the nut S/A 41 (standard product) for measurement of the relative displacement ΔX is pulled while being rotated in a direction opposite to the tightening direction, and is replaced with another ball screw portion 23 (ranked product) prepared. The other ball screw portion 23 (ranked product) is selected based on data of the measured relative displacement ΔX1.

Specifically, when the measured relative displacement ΔX1 deviates from the displacement specification H to the smaller side, a ball screw portion 23 having an outer pitch circle diameter ϕDpw1 that allows the relative displacement ΔX with respect to the nut S/A 41 (standard product) to increase is selected from among the prepared ranked products. When the measured relative displacement ΔX1 deviates from the displacement specification H to the larger side, the selection is made in a manner opposite to the above-described manner.

After the ball screw portion 23 of the nut S/A 41 is replaced with a new one, the relative displacement ΔX1 is measured again at the measuring step S30, and acceptance/rejection determination is performed at the determination step S40. If it is determined at the determination step S40 that the relative displacement ΔX1 "falls within the displacement specification H", the process proceeds to the assembling step S60. If it is determined at the determination step S40 that the relative displacement ΔX1 "does not fall within the displacement specification H", the processes of the "replacing step S50", the "measuring step S30", and the "determination step S40" are repeated in this order until an acceptance determination is made at the determination step S40.

If it has been determined at the determination step S40 that the relative displacement ΔX1 "falls within the displacement specification H", the nut S/A 41 (standard product) and the ball screw portion 23 (ranked product), the relative displacement ΔX1 of which has been measured, are assembled together to form the ball screw device 40 at the assembling step S60. Through the steps S10 to S60 described above, the ball screw device 40 is assembled in a selectively fitting manner.

The following describes operation of the steering system 10 configured as described above. When the steering wheel 12 is steered, steering torque is transmitted to the steering shaft 13, whereby the steering operation shaft 20 is moved in the axial direction via the rack-and-pinion mechanism including the pinion 13a and the rack 22.

The steering torque transmitted to the steering shaft 13 is detected by the torque detection device 14. The rotational position of the output shaft 37 of the motor M, for example, is detected by a rotation-angle detection sensor (not depicted). Based on the steering torque and the rotational position of the motor M, for example, the motor M is controlled to generate assist force. The assist force generated by the motor M is converted into axial movement of the steering operation shaft 20 by the ball screw device 40 to reduce steering force that the driver needs to apply to the steering wheel 12.

The following describes a second embodiment mainly with reference to FIG. 1, FIG. 2, FIG. 7, and FIG. 8, for example. In the production method of the ball screw device 40 according to the first embodiment described above, the nut S/A 41 is used as the "standard product", the ball screw portion 23 is used as the "ranked product", and the relative displacement ΔX is measured. However, the present invention is not limited to this mode. A production method of a ball screw device 140 according to the second embodiment may be adopted, in which a ball screw shaft 120 is used as a "standard product", and a nut S/A 141 is used as a "ranked product".

As depicted in FIG. 7, the production method of the ball screw device 140 includes a first preparation step S110, a second preparation step S120, a measuring step S130, a determination step S140, a replacing step S150, and an assembling step S160. Hereinafter, points different from those in the production method of the ball screw device 40 according to the first embodiment will be mainly described.

At the first preparation step S110, the ball screw shaft 120 depicted in FIG. 2 is prepared as a "standard product". The ball screw shaft 120 (standard product) is an "ordinary" ball screw shaft having an outer-peripheral ball rolling groove 120a that is formed on a ball screw portion 123 of the ball screw shaft 120 and the outer pitch circle diameter φDpw1 of which falls within a predetermined dimensional specification.

At the second preparation step S120, as a plurality of ranked products, a plurality of types of nut subassemblies (nut S/As) 141 into each of which a ball nut 142 and a retainer 145 are integrated with rolling balls 143 interposed therebetween, and each of which can be assembled with the ball screw shaft 120 (standard product). Specifically, a plurality of dimensional groups are set for the inner pitch circle diameter φDpw2 of an inner-peripheral ball rolling groove 142a of the ball nut 142 or the diameter φB of the rolling balls 143. The types of the nut S/As 141 each of which is formed such that the inner pitch circle diameter φDpw2 or the diameter φB of the rolling balls 143 matches an inner pitch circle diameter φD2 or a diameter φB1 belonging to any one dimensional group among the dimensional groups are prepared as the ranked products. Herein, the inner pitch circle diameter φD2 of the inner-peripheral ball rolling groove 142a or the diameter φB1 of the rolling balls 143 is processed one by one so as to belong to any one of the dimensional groups.

Herein, the ball nut 142 and each rolling ball 143 may be formed such that the inner pitch circle diameter φDpw2 and the diameter φB match an inner pitch circle diameter φD2 and a diameter φB1 both belonging to any one dimensional group among the dimensional groups (ranks), respectively, and both of them may be used as ranked products. However, in the following description, it is assumed that, in each nut S/A 141 (ranked product), either one of the inner pitch circle diameter φDpw2 of the ball nut 142 and the diameter φB of the rolling balls 143 belongs to any one dimensional group among the dimensional groups (ranks).

Because the measuring step S130 and the determination step S140 are similar to the measuring step S30 and the determination step S40 in the first embodiment, description thereof is omitted.

The replacing step S150 is substantially similar to the replacing step S50 in the first embodiment, but is different therefrom in that the ranked product to be replaced is the nut S/A 141 instead of the ball screw shaft 120.

At the replacing step S150, the ball screw shaft 120 (standard product) that is screwed into the nut S/A 141 (ranked product) for measurement of the relative displacement ΔX is pulled while being rotated in a direction opposite to the tightening direction. The nut S/A 141 (ranked product) is then replaced with another nut S/A 141 (ranked product) prepared. The other nut S/A 141 (ranked product) is selected based on data of the measured relative displacement ΔX1.

Specifically, when the measured relative displacement ΔX1 deviates from the displacement specification H to the smaller side, a nut S/A 141 including a ball nut 142 having an inner-peripheral ball rolling groove 142a of the inner pitch circle diameter φDpw2 or rolling balls 143 of the diameter φB1 are selected from among the prepared ranked products. The inner-peripheral ball rolling groove 142a of the inner pitch circle diameter φDpw2 or the rolling balls 143 of the diameter φB1 allow the relative displacement ΔX with respect to the ball screw shaft 120 (standard product) to increase. When the measured relative displacement ΔX1 deviates from the displacement specification H to the larger side, the selection is made in a manner opposite to the above-described manner.

At the determination step S140, processes after the acceptance/rejection determination is performed is similar to those at determination step S40 in the first embodiment. The assembling step S160 is similar to the assembling step S60 in the first embodiment. Thus, advantageous effects similar to those in the first embodiment can be expected.

The following describes a modification 1 of the first embodiment. In the first embodiment, when the ball screw portion 23 is prepared in plurality by types as ranked products at the second preparation step S20, each ball screw portion 23 is processed one by one such that the outer pitch circle diameter φDpw1 of the outer-peripheral ball rolling groove 20a formed thereon matches an outer pitch circle diameter φD1 that belongs to any one dimensional group among the dimensional groups set in advance, and the outer pitch circle diameter φD1 thereof is measured and sorted to be ranked. However, the present invention is not limited to this mode.

As the modification 1 of the first embodiment, at the second preparation step S20, a plurality of master assemblies (not depicted) of nut S/As, to each of which an ordinary ball screw shaft can be assembled, may be prepared in advance, and ordinary ball screw shafts prepared at the first preparation step S10 may be each assembled to these master assemblies. The relative displacement ΔX1 may be then measured, the ball screw portions 23 may be ranked based on the measurement results of the relative displacement ΔX1, and the ball screw portions 23 as ranked products may be sorted to be prepared. Herein, criteria for the relative displacement ΔX1 in sorting the ball screw portions 23 from the ordinary ball screw shafts may be optionally determined.

The master assembly of each nut S/A is formed in advance such that the inner pitch circle diameter φDpw2 of the ball nut 42 corresponding to a desired outer pitch circle diameter φD1 of the outer-peripheral ball rolling groove 20a matches a first master value φDm within the range of the dimensional specification, and the diameter φB of the rolling balls 43 matches a second master value φBm within the range of the dimensional specification. This allows the ball screw portions 23 as the ranked products to be easily selected from among the ordinary ball screw shafts.

The following describes a modification 2 of the second embodiment. In the second embodiment, when the nut S/A 141 is prepared in plurality by types as ranked products at the second preparation step S120, the ball nut 142 or each rolling ball 143 is processed one by one such that the inner pitch circle diameter φDpw2 thereof or the diameter φB thereof matches an inner pitch circle diameter φD2 or a diameter φB1 that belongs to any one dimensional group among the dimensional groups, and then the inner pitch circle diameter φD2 or the diameter φB1 is measured and sorted to be ranked. However, the present invention is not limited to this mode.

As the modification 2 of the second embodiment, at the second preparation step S120, a plurality of master bodies (not depicted) of ball screw shafts 120, to each of which an ordinary nut S/A can be assembled, may be prepared in advance, and ordinary nut S/As may be each assembled to these master bodies. The relative displacement $\Delta X1$ may be then measured, and based on the measurement results of the relative displacement $\Delta X1$, the nut S/As 141 as ranked products may be sorted to be prepared. Herein, criteria for the relative displacement $\Delta X1$ in sorting the nut S/As 141 may be optionally determined. The master bodies of the ball screw shafts 120 are produced such that the outer pitch circle diameters $\phi Dpw1$ of the ball screw shafts 120 match a plurality of third master values $\phi Dm1$ within the range of the dimensional specification.

The following describes advantageous effects of the respective embodiments. According to the first embodiment and the modification 1, in the production method of the ball screw device 40, the ball screw device 40 includes: the ball screw portion 23 having the outer peripheral surface 20b on which the outer-peripheral ball rolling groove 20a is spirally formed; the ball nut 42 having the inner peripheral surface 42b on which the inner-peripheral ball rolling groove 42a is spirally formed; the rolling balls 43 that are arranged between the outer-peripheral ball rolling groove 20a and the inner-peripheral ball rolling groove 42a in a circulatable manner; and the retainer 45 disposed between the outer periphery of the ball screw portion 23 and the inner periphery of the ball nut 42, and having the cylindrical portion 45a with the retainer grooves 26 that retain the rolling balls 43 such that radially outward movement of the rolling balls is allowed and radially inward movement thereof is restricted.

The production method includes: the first preparation step S10 of preparing, as the standard product, the nut subassembly 41, into which the ball nut 42 and the retainer 45 are integrated, with the rolling balls 43 interposed therebetween; the second preparation step S20 of setting the plurality of dimensional groups for the outer pitch circle diameter $\phi Dpw1$ of the outer-peripheral ball rolling groove 20a, and preparing the ball screw portion 23 in plurality by types as the plurality of ranked products, the ball screw portion being capable of being assembled with the standard product, and the outer-peripheral ball rolling groove 20a being formed so as to have the outer pitch circle diameter $\phi D1$ that belongs to any one of the dimensional groups; the measuring step S30 of measuring the relative displacement $\Delta X1$ in the thrust direction between the standard product and one ranked product among the types of the ranked products that are assembled; the determination step S40 of determining whether the relative displacement $\Delta X1$ falls within the displacement specification H; the replacing step S50 of, if it has been determined at the determination step S40 that the relative displacement $\Delta X1$ does not fall within the displacement specification H, replacing the ranked product the relative displacement $\Delta X1$ of which has been measured with another ranked product prepared; and the assembling step S60 of, if it has been determined at the determination step S40 that the relative displacement $\Delta X1$ falls within the displacement specification H, assembling the standard product and the ranked product the relative displacement $\Delta X1$ of which has been measured, thereby forming the ball screw device 40.

As described above, the ball screw portions 23 prepared in plurality by types as the ranked products at the second preparation step S20 are sequentially assembled with the nut subassembly 41 integrated as the standard product, the relative displacement $\Delta X1$ in the thrust direction is checked, and a ball screw shafts 120 with the relative displacement $\Delta X1$ of which falls within the displacement specification H is searched for as an accepted product. Subsequently, the nut subassembly 41 as the standard product and the ball screw portion 23 (ranked product) as the accepted product are assembled into the ball screw device 40. In this manner, by replacing the ball screw portion 23 (ranked product) alone, the ball screw device 40 in which clearances in the thrust direction are accurately controlled and hitting noise is not generated can be produced. This eliminates the need for conventional processes of, when the relative displacement $\Delta X1$ does not fall within the displacement specification H, disassembling the rolling balls and the ball nut that are assembled, replacing all of the rolling balls, washing the ball nut, and assembling these components again. This also eliminates waste because the ball screw portion 23 as the ranked product that has been replaced can be used for another nut subassembly 41 (standard product). Thus, the ball screw device 40 can be produced at low cost.

According to the second embodiment, in the production method of the ball screw device, the ball screw device 140 has the same configuration as that of the ball screw device 40 in the first embodiment. The production method includes: the first preparation step S110 of preparing the ball screw shaft 120 as the standard product; the second preparation step S120 of setting the plurality of dimensional groups for at least one of the inner pitch circle diameter $\phi Dpw2$ of the ball nut 142 and the diameter $\phi B$ of the rolling balls 143, and preparing, as the plurality of types of ranked products, the plurality of types of nut S/As 141, into each of which the ball nut 142 and the retainer 145 are integrated with the rolling balls 143 interposed therebetween, and each of which is capable of being assembled with the standard product and is formed such that at least one of the inner pitch circle diameter $\phi Dpw2$ and the diameter $\phi B$ of the rolling balls 143 matches the corresponding one of an inner pitch circle diameter $\phi D2$ and a diameter $\phi B1$ belonging to any one dimensional group among the dimensional groups; the measuring step S130 of measuring the relative displacement $\Delta X1$ in the thrust direction between one ranked product among the types of the ranked products and the standard product that are assembled; the determination step S140 of determining whether the relative displacement $\Delta X1$ falls within the displacement specification H; the replacing step S150 of, if it has been determined at the determination step S140 that the relative displacement $\Delta X1$ does not fall within the displacement specification H, replacing the ranked product, the relative displacement $\Delta X1$ of which has been measured, with another ranked product prepared; and the assembling step S160 of, if it has been determined at the determination step S140 that the relative displacement $\Delta X1$ falls within the displacement specification H, assembling the standard product and the ranked product, the relative displacement $\Delta X1$ of which has been measured, thereby forming the ball screw device 140.

As described above, the nut S/As 141 prepared in plurality by types as the ranked products at the second preparation step S120 are sequentially assembled with the ball screw shaft 120 as the standard product, the relative displacement $\Delta X1$ in the thrust direction is checked, and a nut S/A 141 (ranked product) the relative displacement $\Delta X1$ of which falls within the displacement specification H is searched for as an accepted product. Subsequently, the ball screw shaft 120 as the standard product and the nut S/A 141 (ranked product) as the accepted product are assembled into the ball screw device 140. In this manner, by replacing the nut S/A 141 alone, the ball screw device 140 can be produced. This eliminates the need for conventional processes of, when the relative displacement ΔX1 is out of the displacement specification H, disassembling the rolling balls 143 and the ball nut 142 that are assembled, replacing all of the rolling balls 143, washing the ball nut 142, and assembling these components again. This also eliminates waste because the nut S/A 141 as the ranked product that has been replaced can be used for another ball screw shaft 120 (standard product). Thus, the ball screw device 140 in which clearances in the thrust direction are accurately controlled and hitting noise is not generated can be produced at low cost.

According to the second embodiment and the modification 2, at the second preparation step S120 in the production method of the ball screw device 140, the plurality of dimensional groups are set for the inner pitch circle diameter ϕDpw2 of the inner-peripheral ball rolling groove 142a of the ball nut 142, and the ball nut 142 is formed such that the inner pitch circle diameter ϕDpw2 matches an inner pitch circle diameter ϕD2 belonging to any one of the dimensional groups. Subsequently, the ball nut 142 thus formed having the inner pitch circle diameter ϕD2 is used to form the nut S/A 141 (ranked product). Thus, the nut S/A 141 as the ranked product can be easily produced.

According to the second embodiment and the modification 2, at the second preparation step S120 in the production method of the ball screw device 140, the plurality of dimensional groups are set for the diameter ϕB of the rolling balls 143, and the rolling balls 43 are formed such that the diameter ϕB matches a diameter ϕB1 belonging to any one of the dimensional groups. Subsequently, the rolling balls 43 thus formed having the diameter ϕB1 are used to form the nut S/A 141 (ranked product). Thus, the nut S/A 141 as the ranked product can be more easily produced.

According to the modification 1 of the first embodiment, at the second preparation step S20, the ball screw portions 23 (ranked products) are each assembled to the master assemblies of the nut subassemblies 41 each of which is formed such that the inner pitch circle diameter ϕDpw2 of the ball nut 42 matches the first master value ϕDm within the range of the dimensional specification, and the diameter ϕB of the rolling balls 43 matches the second master value ϕBm within the range of the dimensional specification. The relative displacement ΔX1 in the thrust direction with respect to each master assembly is measured, and based on measurement results of the relative displacement ΔX1, the ball screw portions are sorted to be prepared in plurality by types as the ranked products. This allows the ball screw portions 23 as the ranked products to be easily selected from among the ordinary ball screw shafts (standard products). Thus, the ball screw device can be produced at lower cost than in a conventional method in which ball screw portions 23 as ranked products are accurately processed and measured to be sorted.

According to the modification 2 of the second embodiment, at the second preparation step S120, the nut subassemblies 141 (ranked products) are each assembled to the master bodies of the ball screw shafts 120 each of which is formed such that the outer pitch circle diameter ϕDpw1 matches the third master value ϕDm1 within the range of the dimensional specification. The relative displacement ΔX1 in the thrust direction with respect to each master body is measured, and the nut subassemblies are sorted based on the measurement results of the relative displacement ΔX1 to be prepared in plurality by types as the ranked products. This allows the nut subassemblies 141 as the ranked products to be easily selected from among the ordinary nut subassemblies (standard products). Thus, the ball screw device can be produced at lower cost than in the conventional method in which the ball nut 142 and the rolling balls 143 are accurately processed to produce the nut subassembly 141 as the ranked product.

In all of the embodiments, the dimensional group may be subdivided, the ranked products may be prepared such that the number of ranked products belonging to each dimensional group is one or less, and one ranked product that is optimum for each individual standard product may be selected at the replacing steps S50 and S150.

According to the embodiments, in a production method of the steering system 10, the steering system is produced by using a low-cost ball screw device 40 or 140 produced by the production method described above. By this production method, the steering system 10 can be produced at low cost.

Not limited to the modes of the embodiments described above, the wall member 46 of the nut S/A 41 or 141 may be attached to any position as long as the wall member 46 has the end surface 46a that faces the end surface 42d or 142d of the ball nut 42 or 142 with a clearance therebetween. In other words, the wall member 46 does not have to be included in the nut S/A 41 or 141. For example, the wall member 46 may be attached to an end surface of the driven pulley 34. Alternatively, the wall member 46 may be attached to part of the second housing 11b. Still alternatively, the wall member 46 may be formed by part of the second housing 11b. In this case, at the first preparation step S10 or S110 to the assembling step S60 or S160 in the production method, the retainer 45 needs to be held so as to be prevented from moving in the axial direction during each operation.

In the embodiments described above, examples have been described in which the ball screw device 40 is used for the electric power steering system 10, for example. However, the present invention may be applied to a ball screw device used in a machine tool, for example, in the same manner. Furthermore, the ball screw device 40 may be applied to any type of ball screw device.

In the embodiments described above, the steering assist mechanism 30 applies steering assist force to the steering operation shaft 20, using as a driving source the motor M having a rotary shaft disposed parallel to the ball screw shaft of the steering operation shaft 20. However, the present invention is not limited to this mode. The steering assist mechanism may be of a type described in a related art (JP 5120040) in which the rotary shaft of a motor is disposed in the same position as that of the ball screw shaft of the steering operation shaft 20. In this case also, similar advantageous effects can be expected.

What is claimed is:
1. A production method of a ball screw device including: a ball screw shaft having an outer peripheral surface on which an outer-peripheral ball rolling groove is spirally formed; a ball nut having an inner peripheral surface on which an inner-peripheral ball rolling groove is spirally formed; a rolling ball that is arranged between the outer-peripheral ball rolling groove and the inner-peripheral ball rolling groove in a circulatable manner; and a retainer disposed between an outer periphery of the ball screw shaft and an inner periphery of the ball nut, and having a cylindrical portion with a retainer groove that retains the rolling ball such that radially outward movement of the rolling ball is allowed and radially inward movement of the rolling ball is restricted, the production method comprising:
 a first preparation step of preparing, as a standard product, a nut subassembly into which the ball nut and the retainer are integrated with the rolling ball interposed between the ball nut and the retainer;

a second preparation step of setting a plurality of dimensional groups for an outer pitch circle diameter of the outer-peripheral ball rolling groove, and preparing the ball screw shaft in plurality by types as a plurality of types of ranked products, the ball screw shaft being formed such that the outer pitch circle diameter belongs to any one of the dimensional groups and being allowed to be assembled with the standard product;

a measuring step of measuring a relative displacement in a thrust direction between one ranked product among the plurality of types of the ranked products and the standard product that are assembled;

a determination step of determining whether the relative displacement falls within a displacement specification;

a replacing step of, if it has been determined at the determination step that the relative displacement does not fall within the displacement specification, replacing the ranked product, the relative displacement of which has been measured, with another ranked product prepared; and an assembling step of, if it has been determined at the determination step that the relative displacement falls within the displacement specification, assembling the standard product and the ranked product, the relative displacement of which has been measured, so as to form the ball screw device.

2. The production method of the ball screw device according to claim 1, wherein at the second preparation step, the ball screw shaft is assembled to a master assembly of the nut subassembly that is formed such that an inner pitch circle diameter of the ball nut matches a first master value within a range of a dimensional specification, and the diameter of the rolling ball matches a second master value within a range of a dimensional specification, the relative displacement of the ball screw shaft in the thrust direction with respect to the master assembly is measured, and the ball screw shaft is sorted based on a measurement result and is prepared in plurality by types as ranked products.

3. A production method of a ball screw device including: a ball screw shaft having an outer peripheral surface on which an outer-peripheral ball rolling groove is spirally formed; a ball nut having an inner peripheral surface on which an inner-peripheral ball rolling groove is spirally formed; a rolling ball that is arranged between the outer-peripheral ball rolling groove and the inner-peripheral ball rolling groove in a circulatable manner; and a retainer disposed between an outer periphery of the ball screw shaft and an inner periphery of the ball nut, and having a cylindrical portion with a retainer groove that retains the rolling ball such that radially outward movement of the rolling ball is allowed and radially inward movement of the rolling ball is restricted, the production method comprising:

a first preparation step of preparing the ball screw shaft as a standard product;

a second preparation step of setting a plurality of dimensional groups for at least one of an inner pitch circle diameter of the ball nut and a diameter of the rolling ball, and preparing, as a plurality of types of ranked products, a plurality of types of nut subassemblies, into each of which the ball nut and the retainer are integrated with the rolling ball interposed between the ball nut and the retainer, and each of which is allowed to be assembled with the standard product and is formed such that at least one of the inner pitch circle diameter and the diameter of the rolling ball belongs to any one of the dimensional groups;

a measuring step of measuring a relative displacement in a thrust direction between one ranked product among the plurality of types of the ranked products and the standard product that are assembled;

a determination step of determining whether the relative displacement falls within a displacement specification;

a replacing step of, if it has been determined at the determination step that the relative displacement does not fall within the displacement specification, replacing the ranked product, the relative displacement of which has been measured, with another ranked product prepared; and an assembling step of, if it has been determined at the determination step that the relative displacement falls within the displacement specification, assembling the standard product and the ranked product, the relative displacement of which has been measured, so as to form the ball screw device.

4. The production method of the ball screw device according to claim 3, wherein at the second preparation step, a plurality of dimensional groups are set for the inner pitch circle diameter of the inner-peripheral ball rolling groove of the ball nut, and each nut subassembly is formed such that the inner pitch circle diameter belongs to any one of the dimensional groups.

5. The production method of the ball screw device according to claim 3, wherein at the second preparation step, a plurality of dimensional groups are set for the diameter of the rolling ball, and each nut subassembly is formed such that the diameter belongs to any one of the dimensional groups.

6. The production method of the ball screw device according to claim 3, wherein at the second preparation step, each nut subassembly is assembled to a master body of the ball screw shaft that is formed such that an outer pitch circle diameter matches a third master value within a range of a dimensional specification, the relative displacement of the nut subassembly in the thrust direction with respect to the master body is measured, and the nut subassembly is sorted based on a measurement result and is prepared in plurality by types as ranked products.

* * * * *